United States Patent [19]

Wilwerding

[11] 4,059,756
[45] Nov. 22, 1977

[54] FOCUS CONTROL SYSTEM WITH DUAL SCAN

[75] Inventor: Dennis J. Wilwerding, Littleton, Colo.

[73] Assignee: Honeywell Inc., Minneapolis, Minn.

[21] Appl. No.: 728,566

[22] Filed: Oct. 1, 1976

[51] Int. Cl.² ............................................. G01U 1/20
[52] U.S. Cl. .................................. 250/201; 250/204; 354/25; 356/4
[58] Field of Search ............... 250/201, 204, 209, 234, 250/235; 324/25; 356/1, 4, 5

[56] References Cited

U.S. PATENT DOCUMENTS

| 3,736,057 | 5/1973 | Harvey | 356/4 |
| 3,967,110 | 6/1976 | Rogers et al. | 250/201 |
| 4,004,852 | 1/1977 | Pentecost | 354/25 |
| 4,011,446 | 3/1977 | Swanberg | 250/201 |

Primary Examiner—David C. Nelms
Attorney, Agent, or Firm—Henry L. Hanson

[57] ABSTRACT

An automatic focus system of the spatial image correlation type uses a dual scan technique. During a first scan, the amplitude of the major extremum in the correlation signal is stored. During the second scan, this stored amplitude is used to pick out the point of best focus.

42 Claims, 19 Drawing Figures

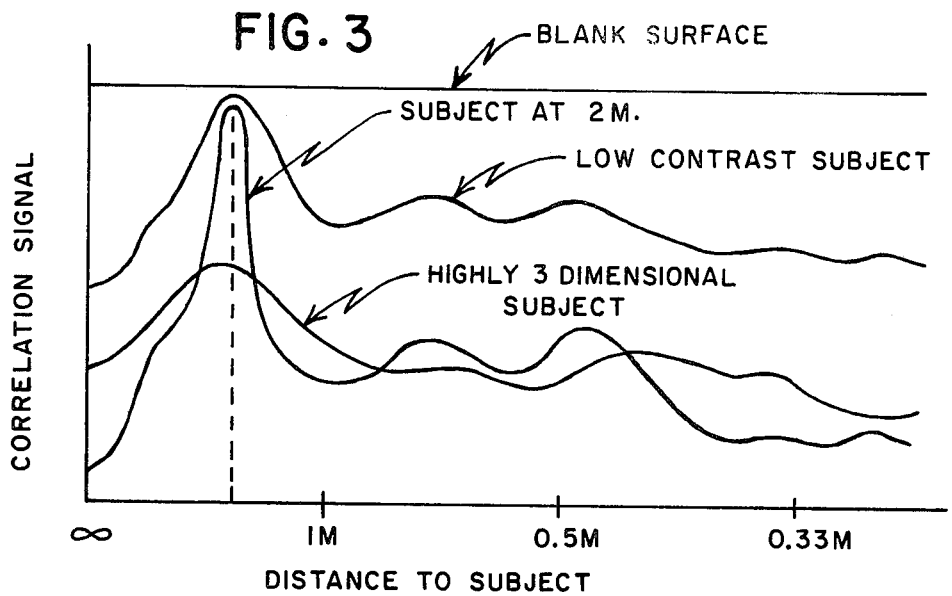
FIG. 3
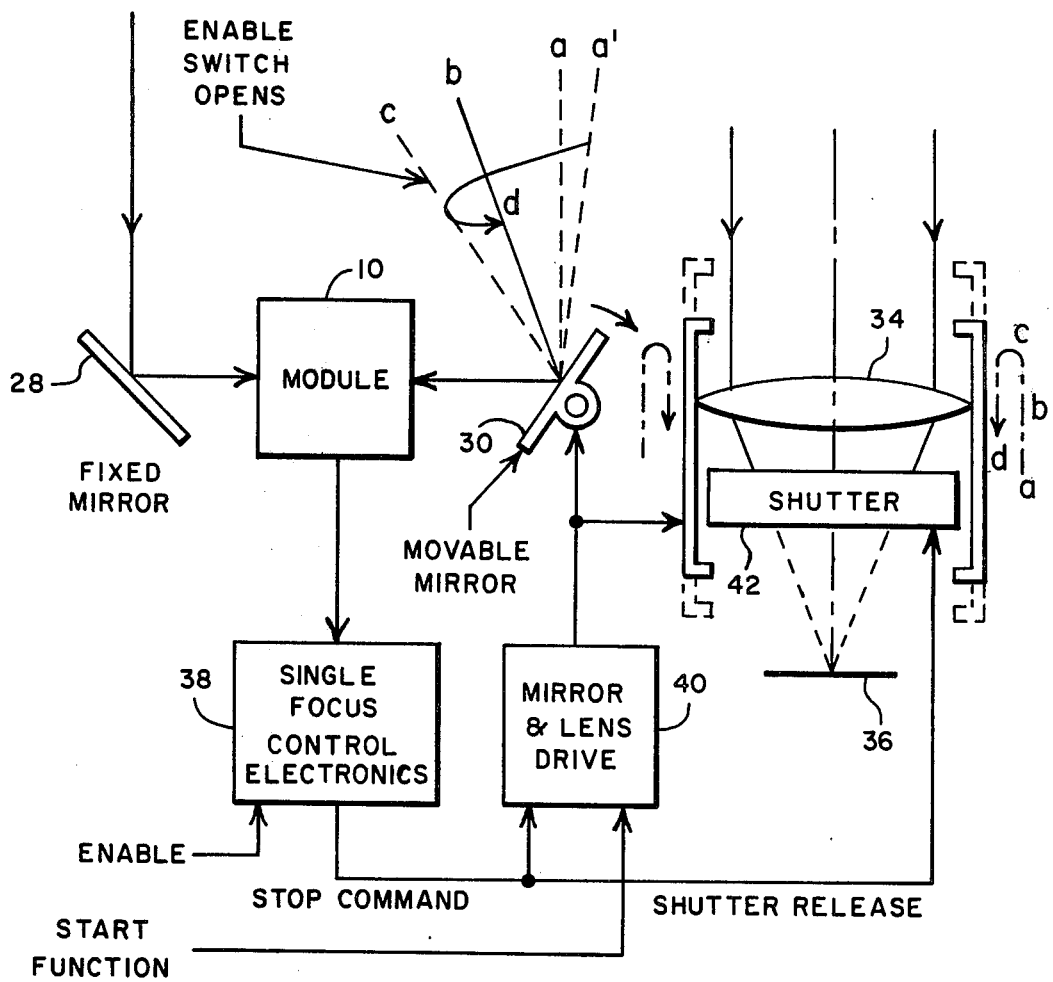
FIG. 4   SINGLE FOCUS SYSTEM

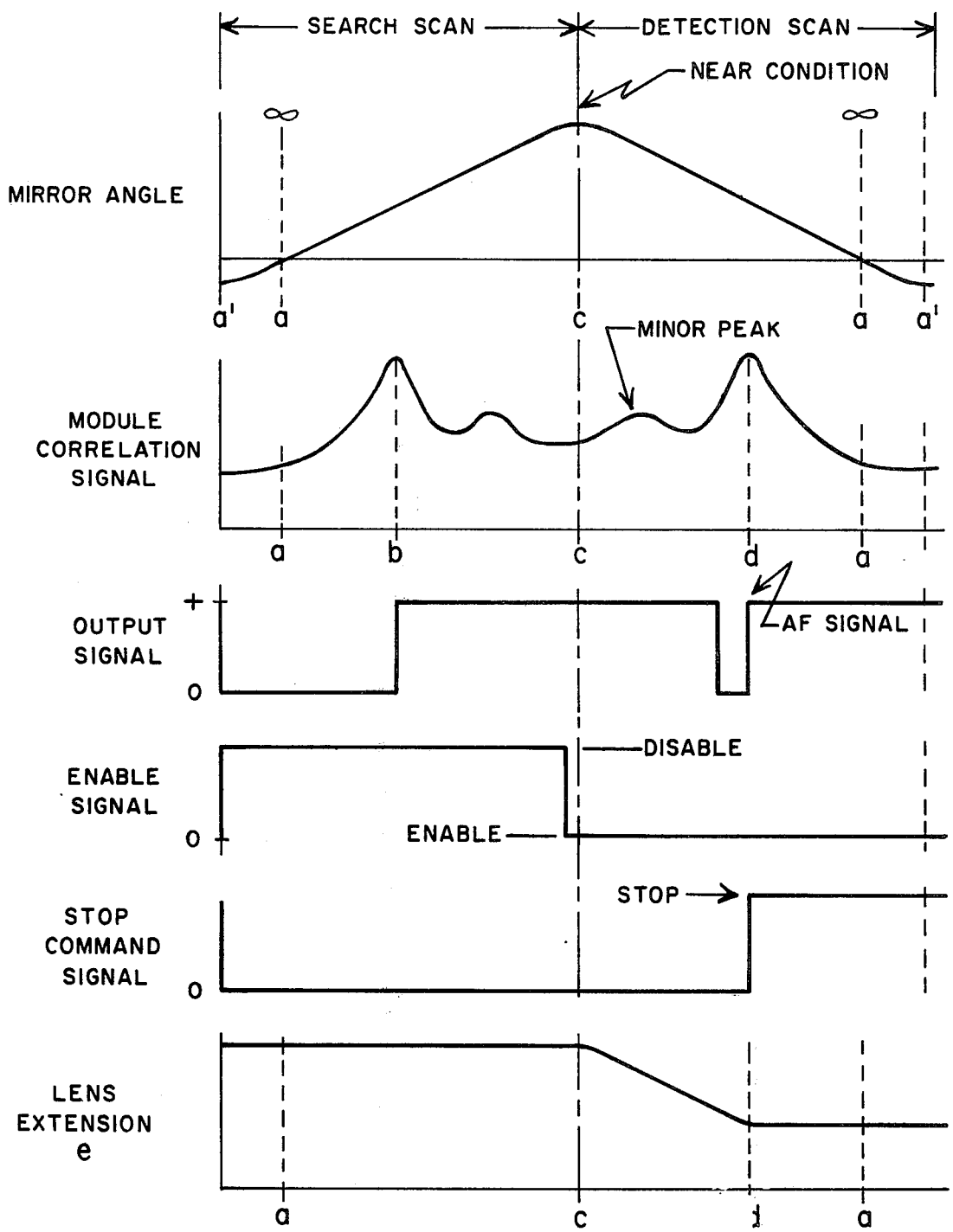
FIG. 5  WAVEFORMS — SINGLE FOCUS SYSTEM

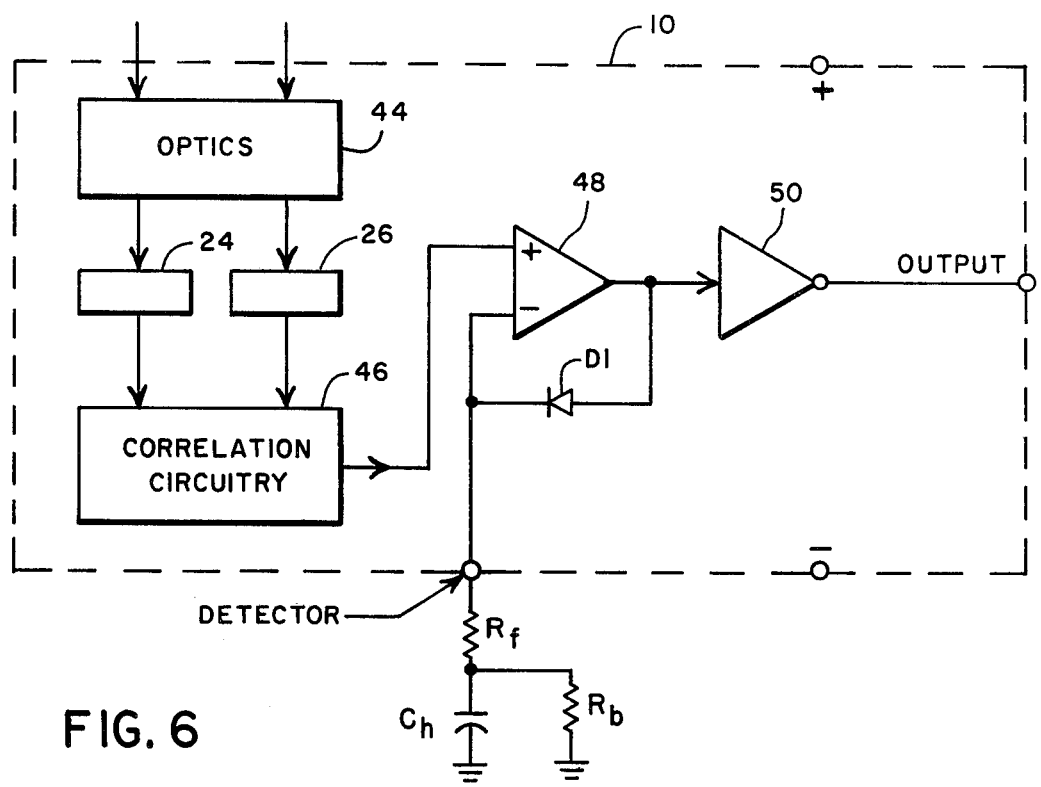
FIG. 6
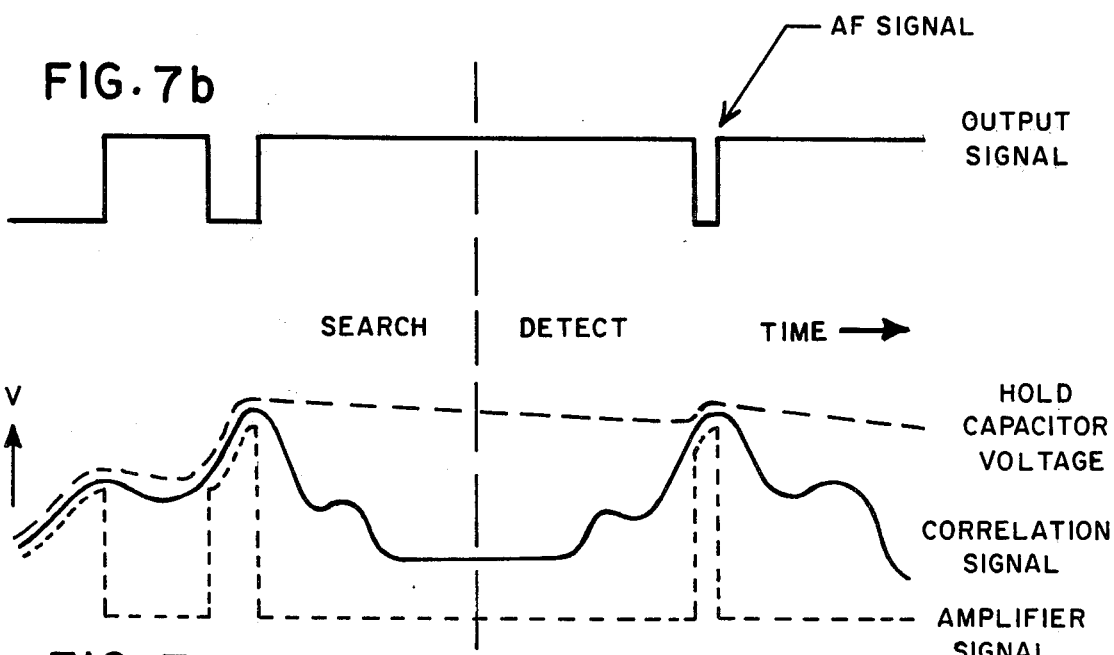
FIG. 7b
FIG. 7a

FOCUS CONTROL SYSTEM WITH DUAL SCAN

REFERENCE TO CO-PENDING APPLICATIONS

Reference is made to co-pending applications by Dennis J. Wilwerding, Ser. No. 728,567, entitled "Focus System for Movie Cameras" and by Dean M. Peterson, Ser. No. 728,565, entitled "Motion Producing Means" which were filed on even date with this application and are assigned to the same assignee.

BACKGROUND OF THE INVENTION

The present invention relates generally to apparatus for providing a measure of the distance between the apparatus and an object. In particular, the present invention is directed to automatic focusing systems in which a primary optical means, such as the taking lens of a camera, is moved to maintain an image of the object in focus at the plane of a photographic film.

One highly advantageous type of automatic focus apparatus is the spatial image correlation type. Examples of the different forms of arrangements of this type can be found in co-pending U.S. Patent applications Ser. No. 627,607, filed Oct. 31, 1975, and Ser. No. 700,963 filed June 29, 1976 by Norman L. Stauffer, which are assigned to the same assignee as the present application, in U.S. Pat. Nos. 3,836,772, 2,838,275, and 3,958,117 by Norman L. Stauffer, and in U.S. Pat. No. 3,274,914 by Biedermann et al.

The typical spatial image correlation apparatus includes two auxilliary optical elements (for example, lenses or mirrors) and two detector arrays. The object distance is determined by moving one of the auxiliary optical elements relative to one of the radiation responsive detector arrays until they occupy a critical or correlation position. This position is a measure of the existing object-to-apparatus distance.

The relative movement of the auxiliary optical element and the detector array occurs for each distance measuring or focusing operation. The critical condition occurs when there is best correspondence between the radiation distributions of the two auxiliary or detection images formed on the two detector arrays. This condition of best distribution correspondence results in a unique value or effect in the processed electrical output signals. Typically, the correlation signal will contain a major extremum (either a peak or a valley) and one or more minor extrema. The major extremum is indicative of the distance to the object.

In most systems, the relative movement of the auxiliary optical element with respect to the detector arrays is achieved by moving a lens or mirror relative to one of the detector arrays. The particular position of the element when best distribution correspondence occurs provides a determination of the existing object-to-apparatus distance. The position of the auxiliary optical element at the time of best correspondence is used to control the position of the primary optical element, such as a camera taking lens.

In the previously mentioned co-pending application Ser. No. 700,963 by Norman L. Stauffer, the correlation signal includes a major peak which is indicative of the distance to an object. A peak detector is used to determine this major peak. A single, complete scan of all focus zones is provided to insure that the highest correlation is achieved. The location of the land and, therefore, highest peak detected corresponds to the desired focus position.

SUMMARY OF THE INVENTION

The system of the present invention is a distance determining and automatic focusing system which uses a "dual scan" technique. The system includes range sensing means, comparison signal means, comparing means and positioning means.

The range sensing means provides a correlation signal having a major extremum indicative of the distance to an object and includes scanning means for providing first and second scans of an image of the object. The comparison signal means provides a comparison signal during the second scan which is a function of the amplitude of the major extremum in the correlation signal during the first scan. The comparing means compares the correlation signal with the comparison signal and produces an output signal which changes from a first to a second state only once during the second scan. The positioning means positions the primary optical means to a position determined by the position of scanning means during the second scan when the output signal changes state.

BRIEF DESCRIPTION OF THE DRAWINGS

FIG. 3 shows the correlation signal as a function of distance to the subject for several different conditions.

FIG. 4 shows a dual scan single focus system for a still camera.

FIG. 5 shows waveforms associated with the operation of the system of FIG. 4.

FIG. 6 shows the peak detection circuitry associated with the module of FIG. 1.

FIGS. 7a and 7b show an example of the hold capacitor voltage, correlation signal, amplifier signal, and output signal produced by the module of FIGS. 1 and 6.

DETAILED DESCRIPTION OF THE PREFERRED EMBODIMENTS

Image Correlation Range Sensing Means

Figure 1:
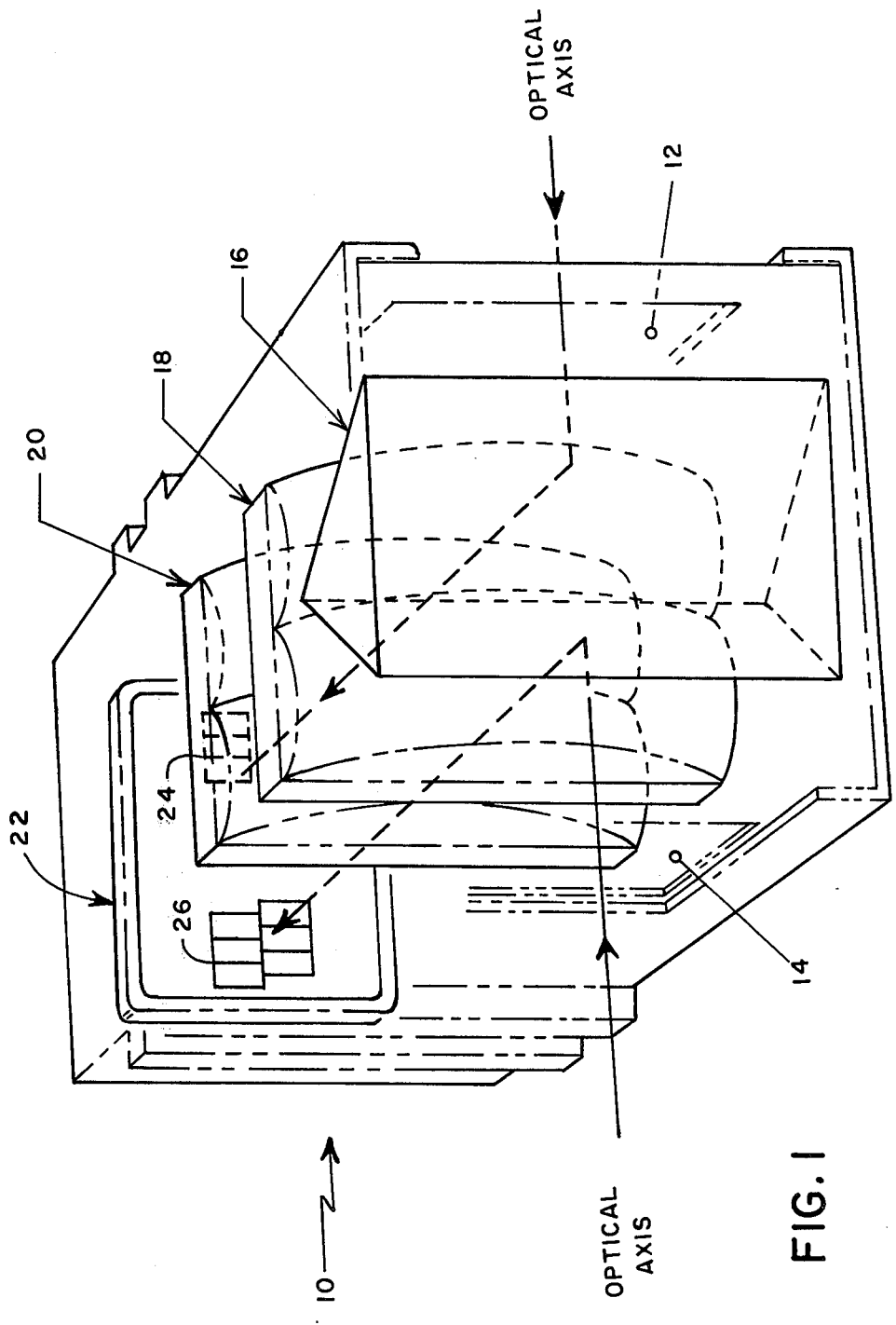
FIG. 1 shows a spatial image correlation range sensing module which may be used in conjunction with the dual scan automatic focus system of the present invention.

FIG. 1 shows one particularly advantageous form of image correlation range sensing means which may be used in the dual scan automatic focus system. A more detailed description of this modular form of range sensing means may be found in the co-pending application by Norman L. Stauffer, Ser. No. 627,607.

Module 10 of FIG. 1 has two viewing ports, 12 and 14, located on opposite sides. Inside the module is a prism, 16, a twin two-element lens system formed by twin biconvex lens 18 and twin meniscus lens 20, and an integrated circuit 22 including detector arrays 24 and 26 and signal processing circuitry (not shown) connected to the detector arrays. The elements in the module are permanently mounted and require no adjustment or alignment.

Figure 2:
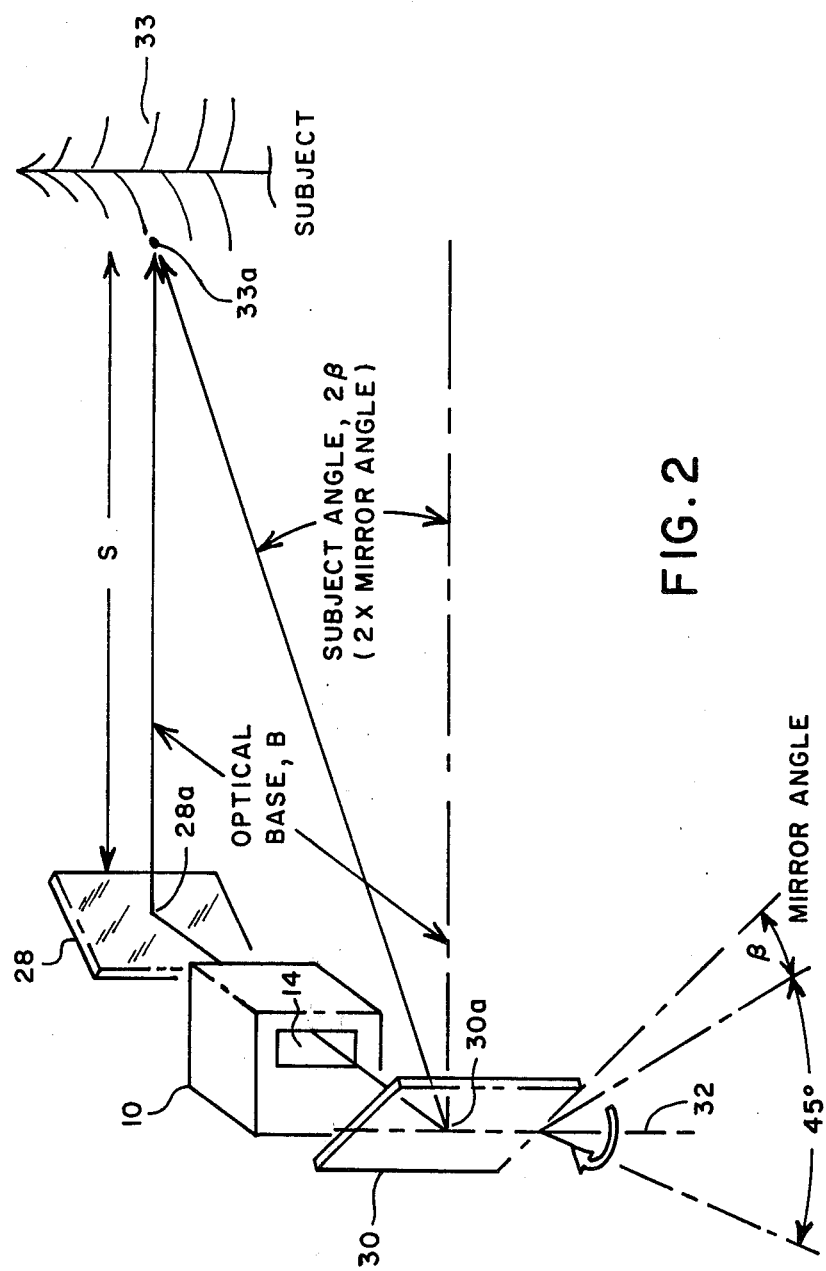
FIG. 2 shows the basic optical configuration of a system using the module of FIG. 1.

To use module 10, two mirrors 28 and 30, must be positioned so as to direct light from the subject into the two viewing ports. Such a basic system is illustrated in FIG. 2. Mirror 28 provides a fixed view of a portion of the subject field. This portion of the field is imaged within the module 10 onto detector array 24. Mirror 30 is mounted so that it can be rotated about an axis, 32, generally perpendicular to the plane formed by points 28a and 30a on mirrors 28 and 30 and a centralized point 33a on a remote subject 33. Adjustment of mirror 30 allows detector array 26 to view a selected area of the subject field. The light intensity pattern on each array is nearly identical when the subject angle fulfills the conditions, $$\tan(2\beta) = B/S,$$

Where $\beta$ is the angle through which mirror is rotated from a 45° position where light from infinity is reflected into viewing port 14. As seen in FIG. 2, angle $2\beta$ is the angle between a line drawn from point 33a on subject 33 and point 30a on mirror 30 and a line drawn from point 33a on subject 33 and point 28a on mirror 28. $\beta$ is the length of the base from point 28a on mirror 28 to point 30a on mirror 30, and S is the distance between point 33a on subject 33 and point 28a on mirror 28. This identity is recognized by the correlation electronics of integrated circuit 22 as a major extremum (preferably a peak) in the correlation signal.

FIG. 3 illustrates the correlation signal as a function of distance to the subject. In FIG. 3, a subject at approximately 2 meters distance from the optical system produces a peak output corresponding to that distance, as shown by the curve labelled "subject at 2M". At the infinity position mirrors 28 and 30 are each at 45°, thus directing the optical axis from each port into two parallel lines. As movable mirror 30 is adjusted from this position, the correlation signal as illustrated in FIG. 3 is produced. Secondary peaks of lesser amplitude may be present as indicated in FIG. 3. If the optical system views a complete blank surface, devoid of any brightness variations, then the correlation signal will be a constant high level. A very low contrast subject will produce, as indicated, a signal which does not drop very much below peak value at out of correlation conditions. A highly three-dimensional subject may not produce as high a peak signal as that produced by a strictly two-dimensional flat scene.

Dual Scan Single Focus Systems

The present invention is a dual scan automatic focus system which is used in conjunction with spatial image correlation range sensing means. During the first scan (the "search scan"), the correlation signal from the spatial image correlation range sensing means is interpreted and the amplitude of the major extremum of the correlation signal is stored. In the second scan (the "detection scan"), which is typically a reverse direction scan, a comparison signal which is a function of the stored amplitude is compared to the correlation signal to pick out the proper point of best focus.

In the dual scan system of the present invention, two angular scans of mirror 30 are required. The first scan is in one direction (for example, from far to near), and in the second scan the direction of scanning mirror 30 may be reversed (for example, from near to far).

During the scanning operation, the relative positions of the radiation distributions on the first and second detector arrays 24 and 26 vary with time. The signal processing circuitry on integrated circuit 22 compares the signals from the first and second detector arrays 24 and 26 and produces a time varying correlation signal which exhibits a major extremum when the best correspondence of the radiation distributions on first and second detector arrays 24 and 26 if obtained.

The basis of the present invention is the storing of the amplitude of the major extremum during the first scan and the use of that amplitude to locate the major extremum during the second scan. The primary optical means (e.g. a camera taking lens) is moved to the correct focus position during or immediately after the second scan.

The dual scan system may be used with either still cameras or motion picture cameras. In either case, the first scan of the dual scan is used to store the amplitude of the major extremum and the second scan is used to position the primary optical element (the taking lens) to a position determined by the position of scanning mirror 30 when the major extremum occurs in the second scan.

A dual scan single focus system for a still camera is shown in basic diagram form in FIG. 4. The system includes module 10, mirrors 28 and 30, taking lens 34, film 36, single focus control electronics 38, mirror and lens drive 40 and shutter 42.

Movable mirror 30 is prepositioned to an angle such that the viewing optical axis, a', lies beyond the normal infinity position. At a start function command, mirror 30 is released to move first through the infinity position, a, and then on through to eventually reach an angular position, c, where the axis intercepts the fixed axis at the near subject range. It then starts its return travel back toward a'. The entire cycle is indicated by the top waveform in FIG. 5. The first half of the cycle to a' to c is the search scan, and the second half cycle (the return from c to a') is the detection scan. The second waveform in FIG. 5 indicates the corresponding correlation signal produced for this scan cycle. The correlation signal during the search scan from a to c is similar to that indicated in FIG. 3. The correlation signal during the detection scan is a mirror image of the signal from a to c if the system is allowed to complete the entire cycle.

An enable signal or function is provided which changes state before the start of the detection scan when mirror 30 is approximately at position c. The enable signal may be produced by an enable switch linked to mirror 30 or may be produced electronically.

The module circuitry operates on the correlation signal to give a positive voltage logic level change at the first peak encountered and at each subsequent peak which is approximately equal to or greater than the previous indicated peak. The output from the module circuitry is termed the "output signal".

Both the output signal and the enable signal connect to the single focus control electronics 38 in FIG. 4. The enable signal allows single focus control electronics 38 to control the position of lens 34 in accordance with the single positive transition in the output signal during the detection scan. This single positive transition is termed the "AF signal". The AF signal may lag the actual correlation peak at $d$ by a very slight variable amount due to the characteristics of the peak detecting electronics. This delay is termed the "focus lag".

The desirability of using a dual scan system is its highly reliable rejection of minor peaks which might activate the peak detection circuitry prematurely. The dual scan system also provides rejection of false correlation peaks which might be introduced by violent camera or subject motion.

Three alternatives might be considered for coupling the camera taking lens to the auto focus system. The first alternative is a system in which the camera lens moves with the movable mirror always maintaining a position focused on the intercept of the scan mirror and fixed mirror optical axes. The AF signal may be used to rapidly terminate the motion of this mechanical system at the appropriate focus position. A slight bias to the position of the taking lens may be provided to compensate for any delay in the motion terminating mechanism. This system, however, requires movement of the taking lens 34 even during the search scan.

The second alternative is a system in which the camera lens is fixed during the search scan and only moved during the detection scan, again stopping it rapidly at the focus position. The stop command signal from single focus control electronics 38 and the lens extension $e$ (i.e. the distance from the infinity position of the lens) are shown in FIG. 5 for this type of system.

In FIG. 5, the lens extension is constant during the search scan. In other words, taking lens 34 is maintained at its near limit position until the beginning of the detection scan. During the detection scan, lens 34 moves in a predetermined relationship with mirror 30 until the stop command signal stops lens 34. Changes in the output signal during the search scan have no effect because the enable signal is in the "disable" state. Shortly before commencement of the detection scan, the enable signal switches to the "enable" state. The occurrence of the AF signal and the enable signal being in the enable state cause the stop command signal to be produced when the major correlation peak occurs during the detection scan.

The third alternative is a modification of the second system in which the position of a fixed stop is controlled by the scan mirror and AF signal. Lens 34 is released and allowed to travel to this stop after the focus sequence has been completed (i.e. after the detection scan). This is a means to reduce further the system inertia during the focus cycle.

It is desirable in an auto/focus system to provide the final focus motion of lens 34 from the near focus position toward infinity so that in the rare event that no AF signal occurs the lens may be stopped at its hyperfocal position to provide a generally acceptable picture. Such a condition might occur when taking a scenery picture and the auto/focus system was viewing blank sky.

Dual Scan Peak Detection and Production of the AF Signal

FIG. 6 shows module 10 as it is used in a preferred embodiment of the present invention. Module 10 includes optics (generally designated by numeral 44) for forming two images, two detector arrays, 24 and 26, and correlation circuitry 46 for producing an analog correlation signal proportional to the degree of correlation of the respective optical images. The correlation signal increases positively with increasing correlation.

Extremum sensing circuitry is provided in module 10 to process the correlation signal to determine when the major correlation extremum occurs. In the preferred embodiment shown in FIG. 6, the major extremum is a peak and the extremum sensing circuitry is peak detection circuitry. This circuitry includes differential amplifier 48, diode D1, inverter 50, filter resistor $R_f$, discharge timing resistor $R_b$, and hold capacitor $C_h$. In the embodiment shown in FIG. 6, resistors $R_f$ and $R_b$ and capacitor $C_h$ are external components and are connected to the "Detector" terminal of module 10. Module 10 develops, at the terminal entitled "Output" a digital positive going output signal (i.e. the AF signal) at correlation maxima capable of operating external circuitry to stop the camera lens at the proper focus position. It is this change of state of the output signal (i.e. the AF signal), and not the output signal level, which is indicative of the occurrence of a focus peak.

Hold capacitor $C_h$ connected to the "Detector" terminal provides a hold or comparison signal for the peak detection circuitry and to a large extend controls the sensitivity, noise rejection and overall characteristics of the focus system. Differential amplifier 48 compares the correlation signal with the voltage stored on hold capacitor $C_h$. As the correlation signal rises in voltage, the output of amplifier 48 rises in voltage with it, charging capacitor $C_h$ thru feedback diode D1 connected between the output and inverting input. This causes the inverting input to follow the non-inverting input so that the voltage on capacitor $C_h$ is equal to the correlation signal voltage during that portion of time when the correlation signal is rising. Once the correlation signal reaches its peak value and begins to decrease, the voltage on the hold capacitor $C_h$ cannot decrease because of the decoupling of feedback diode D1. Consequently, the output voltage of amplifier 48 falls immediately to negative supply potential. This rapid decrease in the amplifier signal is indicative of a correlation or major peak having occurred. The amplifier signal following a complex correlation waveform is shown in FIG. 7a. FIG. 7b shows the output signal from module 10 produced for the dual scan of FIG. 7a.

During the search scan shown in FIGS. 7a and 7b, the amplifier signal follows the input correlation signal until the first minor peak is reached, at which time the signal drops to negative supply. The amplifier signal begins to rise again when the correlation signal achieves the value equal to the first minor peak and continues to rise until the major peak or correlation peak is found. At this point, the amplifier signal again drops to negative supply. During the detection scan, only the correlation peak is detected. This is because hold capacitor $C_h$ has maintained a voltage proportional to the correlation peak detected during the search scan. This hold capacitor voltage or "comparison signal" exceeds the correlation signal for all portions of the detection scan, except the correlation peak. This is the primary virtue of dual scan operation.

Figure 8:
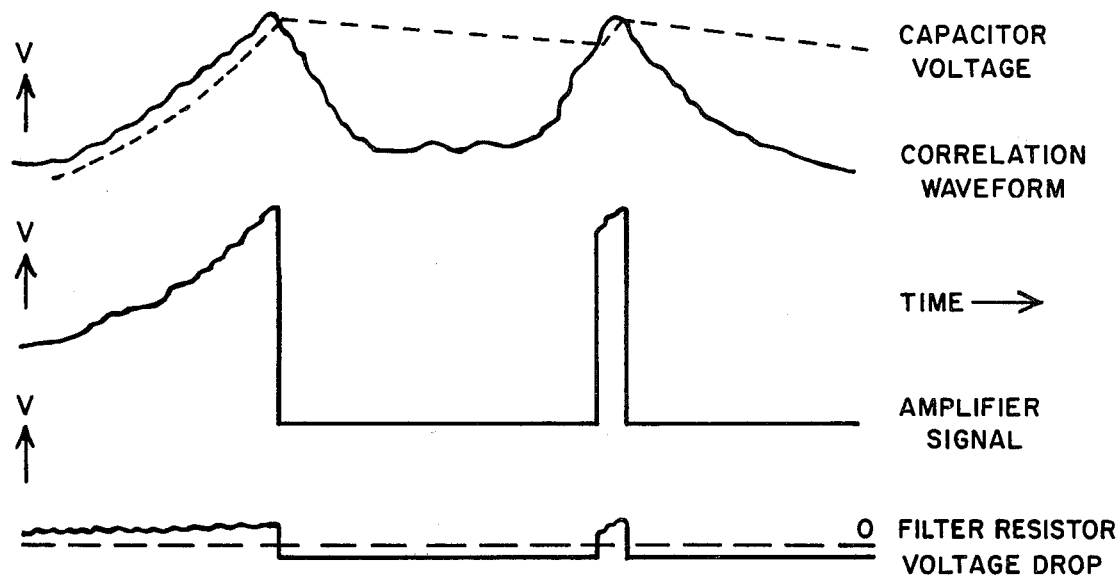
FIG. 8 shows waveforms illustrating the operation of the peak detector filter.

While the peak detection circuitry must be capable of accurately following the correlation signal and determining when a peak occurs, it must at the same time be insensitive to noise on the correlation signal. Noise immunity is achieved by filter resistor $R_f$ in series with the hold capacitor $C_h$. In FIG. 6, resistor $R_f$ is external to module 10 and preferable has a value of about 300 ohms to maintain amplifier stability. Alternatively, filter resistor $R_f$ may be included in module 10. Filter resistor $R_f$ creates a lag in the hold capacitor voltage so that when the correlation signal begins to decrease, it must decrease by some finite value before the amplifier signal from amplifier 48 changes states. FIG. 8 indicates a correlation signal on which noise occurs. This noise could be caused by either fluorescent light intensity modulation that is induced optically, or electrical noise induced by external sources.

Figure 9:
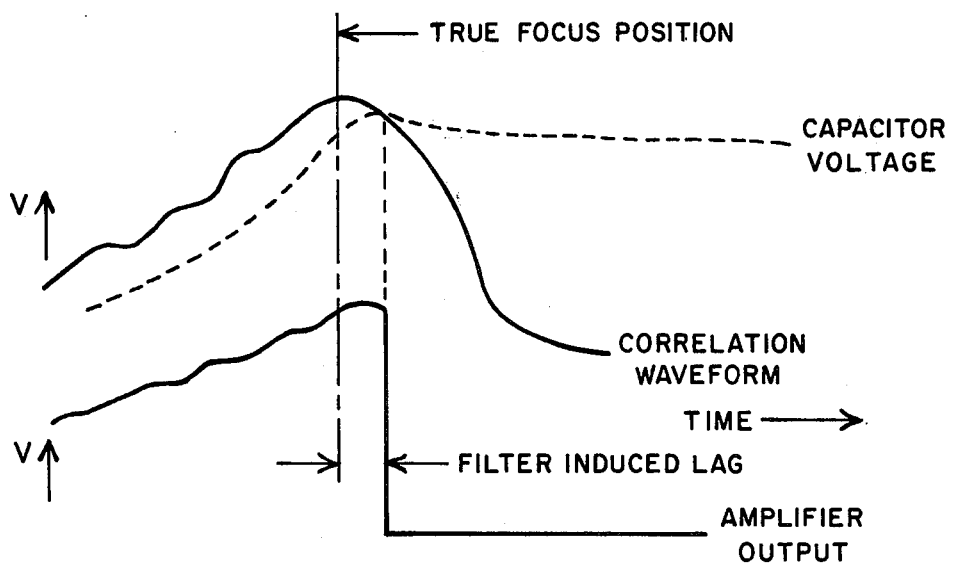
FIG. 9 shows waveforms similar to FIG. 8 but exaggerated to illustrate filter induced focus lag.

As can be seen in FIG. 8, the noise that exists on the correlation signal may cause many transitions during the rising portion of the correlation signal. Resistor $R_f$ in series with holding capacitor $C_h$ eliminates the multiple transitions caused by the noise present on the correlation signal. Noise inhibiting is only effective for rising correlation signals because as the rate of change of correlation signal with respect to time decreases, the effective filtering decreases. An expansion of the peak of the correlation waveform is shown in FIG. 9. The effect of the low-pass noise rejection filter on the hold capacitor voltage is exaggerated for purposes of description.

FIG. 9 indicates that the point at which the amplifier changes states no longer corresponds exactly to the correlation peak, but lags the peak in time. The amount of lag exhibited is dependent upon the rate of change of the correlation signal. This rate of change is affected by the scene contrast, the scene subject content, the chosen focus scan rate, the number of zones of focus required and the optical base length of the focus system. It is because of the variation of these parameters which affect the rate of change of the correlation signal that the value of hold capacitor $C_h$ should be suitably chosen for each application so that the focus lag can be made sufficiently small.

In dual scan operation, it is also necessary to control the amount that hold capacitor $C_h$ discharges between peaks. This is because the correlation signal peak voltages during the search scan and the detection scan may not be equal because of camera motion, subject motion, mirror axis wobble or low scene illumination. The hold capacitor discharge rate is controlled by discharge timing resistor $R_b$ in parallel with the capacitor as shown in FIG. 6.

The resistance of discharge timing resistor $R_b$ is based on hold capacitor $C_h$, the desired amount of droop in the hold capacitor voltage, and the maximum time between peaks. In focus systems requiring a small value hold capacitor, the use of an external discharge timing resistor is frequently not required because of approximately 1 microampere of leakage current presented by the input impedance of $Ri$ of amplifier 48. This is equivalent to 3.5 megohms of total bleed resistance $R_b'$.

Figure 10:
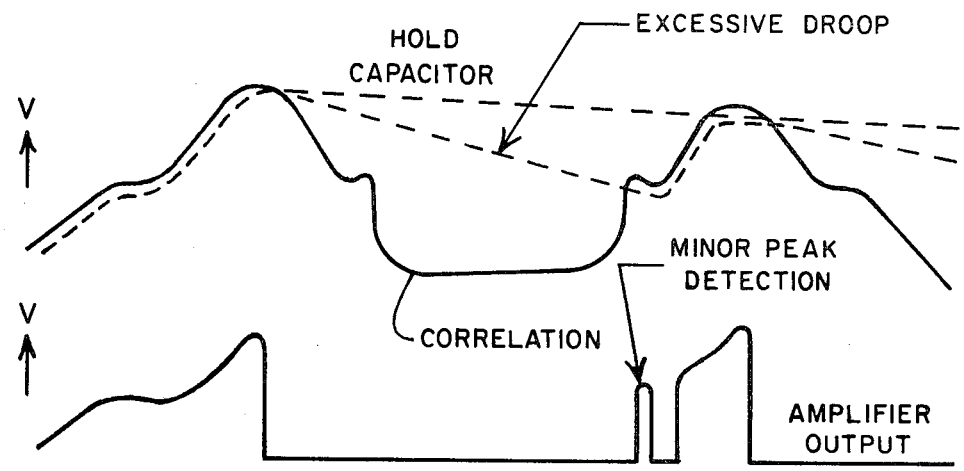
FIG. 10 shows waveforms which illustrate the effect of different values of the discharge timing resistor.

The effect of using a discharge timing resistor $R_b$ is shown in FIG. 10. Decreasing the value of discharge timing resistor $R_b$ increases the amount of droop in the detection hold capacitor voltage. Excessive droop may cause the focus system to accept a minor peak during the detection scan.

The value of hold capacitor $C_h$ is chosen from a knowledge of the minimum time ($T_z$) required for the focus system to traverse a single focus zone. The capacitor voltage must charge to a level sufficiently close to the correlation voltage within $T_z$ to insure that a decrease in correlation can be detected within that focus zone. A suitable solution is to choose the filterresistor-hold capacitor time constant $R_f C_h = \frac{1}{4} T_z$, resulting in less than a 2% difference between the correlation and hold capacitor voltages in a zone interval $T_z$.

Other time constants can be chosen with corresponding variations in the system lag and noise sensitivity. Setting the time constant equal to $\frac{1}{3}$ to $\frac{1}{4}$ of a zone interval, however, has yielded consistently good results.

Discharge timing resistor $R_b$ is chosen based on the maximum possible time interval $T_s$ between focus peaks. Since the capacitor voltage decay between focus peaks is expotential, the decay time constant is given by $$R_b C_h = -T_s/\ln(1-\% \text{ droop}).$$

In a well designed system, a capacitor voltage droop between major correlation peaks of 5 to 10% is sufficient to insure that the peak will be detected while maintaining minor peak rejection. The value of $R_b'$ determined from the above equation includes the input resistance $Ri$ of detector amplifier 48. The actual additional discharge timing resistance $R_b = (R_b' \cdot Ri)/(Ri - R_b')$.

Dual Scan Single Focus Control Electronics

The AF signal (i.e. the positive logic "0" to logic "1" transition in the output signal during the detection scan) indicates that the major correlation peak has occurred. The single focus control electronics uses the AF signal to develop a control signal capable of stopping the camera lens at the proper focus position by operation of lens drive control means such as a solenoid. The control signal operates the solenoid. Once the AF signal indicating proper focus is accepted during the detection scan, the control signal should remain independent of any change in the correlation. Alternately, the focus system should be mechanically locked to prevent further motion of the camera lens. It is only the transition of logic states that defines the existence of a correlation peak and not the DC level of the output signal.

In dual scan signal focus systems, an enable means signal must be supplied. The enable means permits a "0" to "1" transition of the output signal (i.e. the AF signal) to control the camera lens position only during the detection scan. The system should not be enabled after power is applied until the electronics have stabilized (generally about 5 milliseconds). The enable means may be a switch connected to the scan mirror or may be an electronic circuit. In dual scan operation, the focus system is enabled near the end of the search scan of the scan cycle preceding the near limit of the rotation of the scanning mirror in order that an AF signal transition in the near field may be accepted.

In various system applications it is also desirable to have a signal indicating when the end of the detection scan has occurred. Use of this "end-of-travel" signal is not required for operation of module 10, but is used in systems where it is necessary to have an electrical state change or solenoid operation to initiate some event subsequent to the focus cycle, such as the exposure sequence in a camera system. The end-of-travel signal is provided to handle the situation where the correlation peak does not occur due to rapid subject motion, moving mirror axis wobble, insufficient illumination, or scenes that contain no contrast.

In the operation of the auto focus system, several events must occur in sequence. The first event is the application of power. The search scan portion of the focus cycle is then started. Before completion of the search scan, the single focus control electronics is enabled to allow it to accept and react to the AF signal. Before the detection scan of the focus cycle is begun, the enable means operates to allow the AF signal to be accepted. The detection scan is now begun and the AF signal transition from "0" to "1" is accepted. At this time, switching means in the single focus control electronics changes states, thereby energizing the solenoid which stops the motion of the camera lens or some mechanical member that ultimately controls the position of the camera lens focus. In the event that a correlation peak is not detected during the detection scan, the output of the single focus control electronics can be made to change states by operation of the end-of-travel function. Because it is desirable to have the focus system end up at infinity or the hyperfocal distance in the absence of an AF signal transition, the detection scan should proceed from near range toward infinity. This is the end of a focus cycle and the exposure sequence may now be initiated.

The dual scan single focus control electronics of the present invention may be implemented in a variety of forms. FIGS. 11, 13, 15, and 17 are examples of dual scan single focus control electronics which may be used in accordance with the present invention. The particular control electronics selected will depend on a number of factors, including cost, performance, and compatibility with other automatic features such as automatic exposure control.

Figure 11:
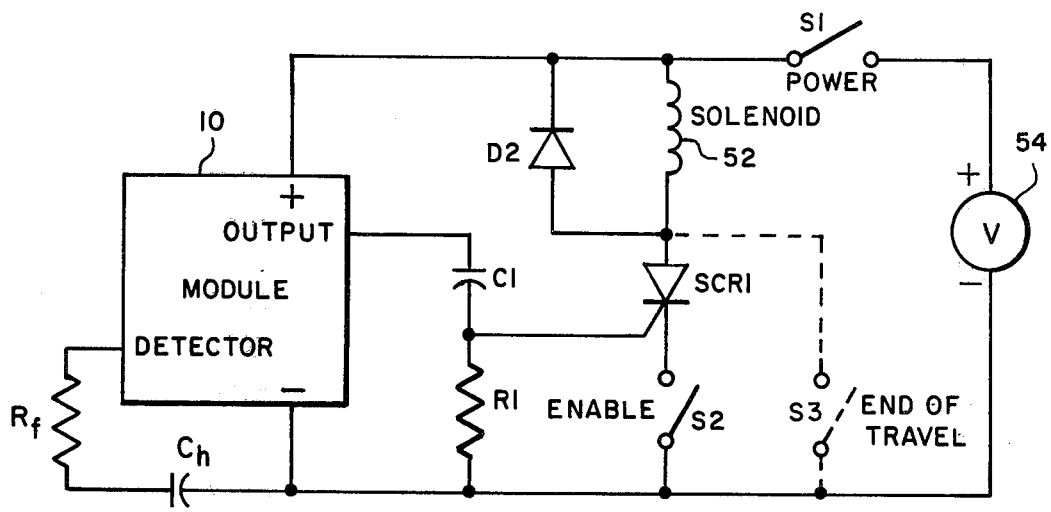
FIG. 11 is a schematic diagram of a minimum component dual scan single focus system.
Figure 12:
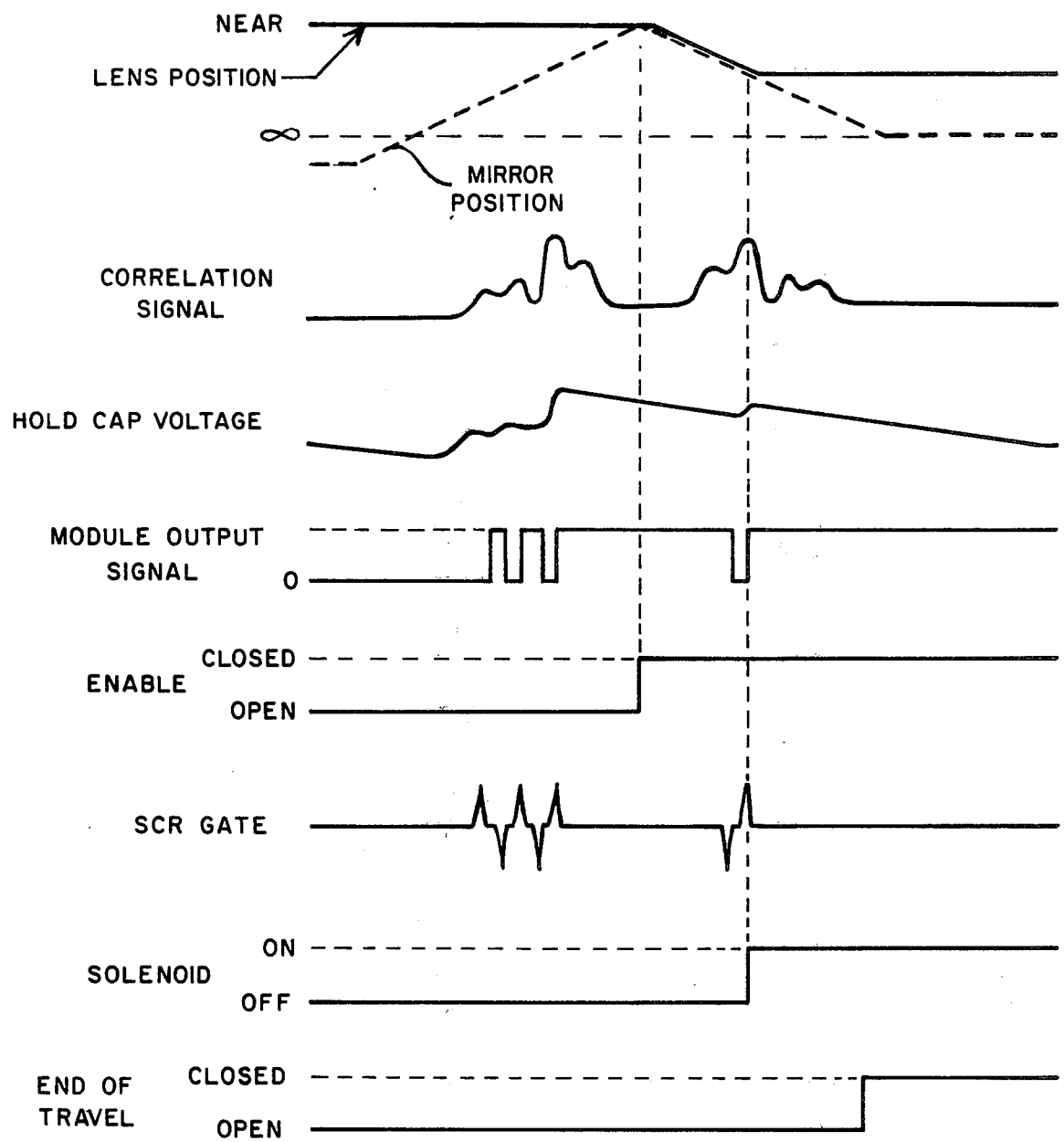
FIG. 12 shows waveforms associated with the operation of the system of FIG. 11.

FIG. 11 shows a minimum component dual scan single focus system. This system includes module 10, filter-resistor $R_f$, hold capacitor $C_h$, solenoid 52, power supply 54, SCR1, diode D2, a differentiator formed by capacitor C1 and resistor R1, power switch S1, enable switch S2, and optional end-of-travel switch switch S3. FIG. 12 shows signal waveforms associated with the dual scan single focus system of FIG. 11.

Prior to operation, the system is de-energized and the taking lens is in a predetermined position (preferably its near limit position). Operation of the system is commenced by closing of power switch S1. This applies power to the "+" and "−" terminals of module 10 and also applies power across a series circuit formed by solenoid 52, anode to cathode of SCR1, and enable switch S2.

The differentiator formed by C1 and R1 receives the output signal from module 10. The differentiated output signal is applies to the gate of SCR1.

During the search scan, the module output signal, as shown in FIG. 12, changes states from "0" to "1" three times as successively larger peaks are reached. With each transition from "0" to "1" of the output signal, a positive pulse is applied to the gate of SCR1. SCR1 is not turned on, however, because enable switch S2 is open until nearly the end of the search scan.

As shown in FIG. 12, enable switch S2 closes approximately at the end of the search scan. When enable switch S2 is closed, a positive pulse to the gate of SCR1 will turn on SCR1 and energize solenoid 52. It is important, therefore, that only one pulse be applied to the gate of SCR1 during the detection scan and that this single positive pulse corresponds to the maximum peak in the correlation signal during the detection scan. As previously discussed, the dual scan system achieves this result by the use of hold capacitor $C_h$ and the peak detection circuitry contained within module 10. The hold capacitor voltage stored on capacitor $C_h$ is shown in FIG. 12. There is a slight drift down of the voltage to insure detection of the maximum peak during the detection scan. In the embodiment of FIG. 11, this drift down is provided by internal resistance of the peak detector amplifier but may, alternatively, be provided by an external resistor in parallel with capacitor $C_h$, as has been previously shown in FIG. 6.

Figure 13:
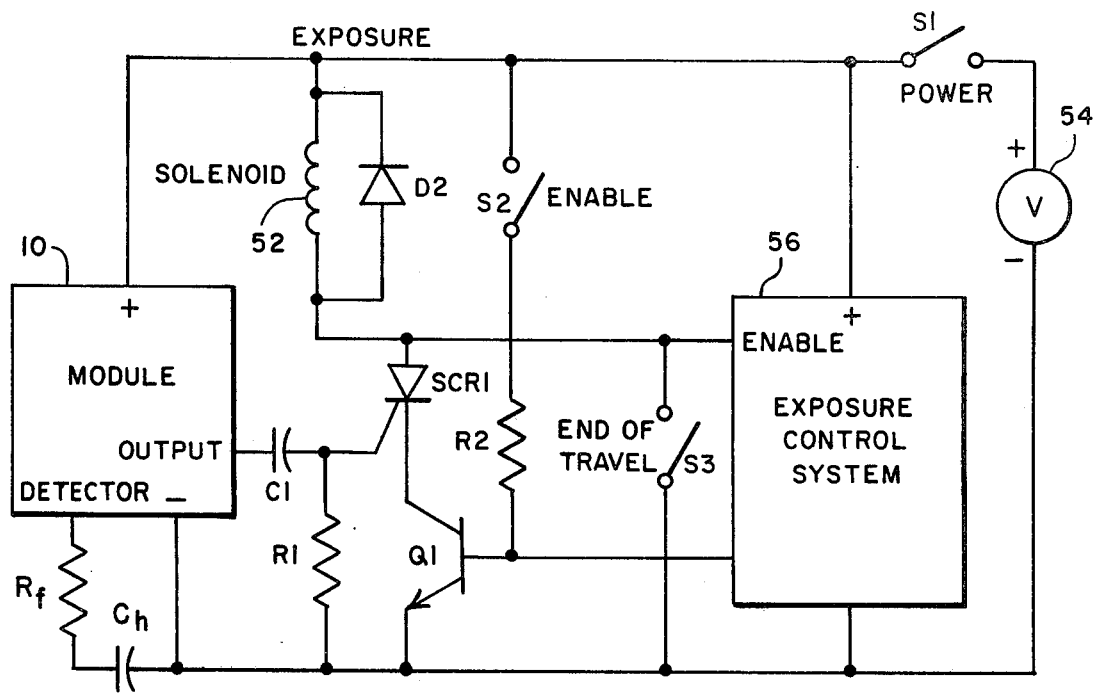
FIG. 13 is a schematic diagram of a dual scan single focus system in which a single solenoid is employed for control of both focus position and exposure.

The output signal during the detection scan exhibits only a single transition from "0" to "1" (the AF signal). As shown in FIG. 13, this transition corresponds to the maximum peak in the correlation signal during the detection scan. The AF signal is differentiated and applied as a positive going pulse to the gate of SCR1. Since enable switch S2 is now closed, SCR1 is turned on, thereby energizing solenoid 52.

During the detection scan, the taking lens is moved from the near field position limit toward the far or infinity position limit at the same rate as the scanning mirror is being moved. When solenoid 52 is turned on, motion of the taking lens (and in many cases the scanning mirror also) is halted. The taking lens, therefore, has been positioned at the point of proper focus.

As shown in FIG. 11, an optional end-of-travel switch S3 may also be included. The end-of-travel switch S3 remains open throughout the search and detection scans. End-of-travel switch S3 closes when the scanning mirror has completed the detection scan. The purpose of end-of-travel switch S3 is to energize solenoid 52 in the event that the entire detection scan has been made without a correlation peak being detected. This is particularly important if solenoid 52 is also used to control the shutter or some other function of the camera.

In the embodiment shown in FIG. 11, enable switch S2 and end-of-travel switch S3 are preferably mechanical switches which are mechanically linked to the scanning mirror. The position of the scanning mirror, therefore, will determine whether enable switch S2 and end-of-travel switch S3 are open or closed.

FIG. 13 shows another dual scan single focus system. In this system, solenoid 52 is employed both for control of focus position and for exposure. The system of FIG. 13 is generally similar to the system of FIG. 11, and similar numerals and letters are used to designate similar elements.

The system of FIG. 13 includes an exposure control system 56 which has an "enable" terminal connected to the anode of SCR1 and a "terminate" terminal connected to the base of transistor Q1. Exposure control system 56 may take one of many different forms well known in the art for automatic exposure control.

Transistor Q1 is connected with its collector-emitter current path connected in series with the anode-cathode current path of SCR1. Enable switch S2 and resistor R2 are connected in series between one terminal of switch S1 and the base of transistor Q1.

Figure 14:
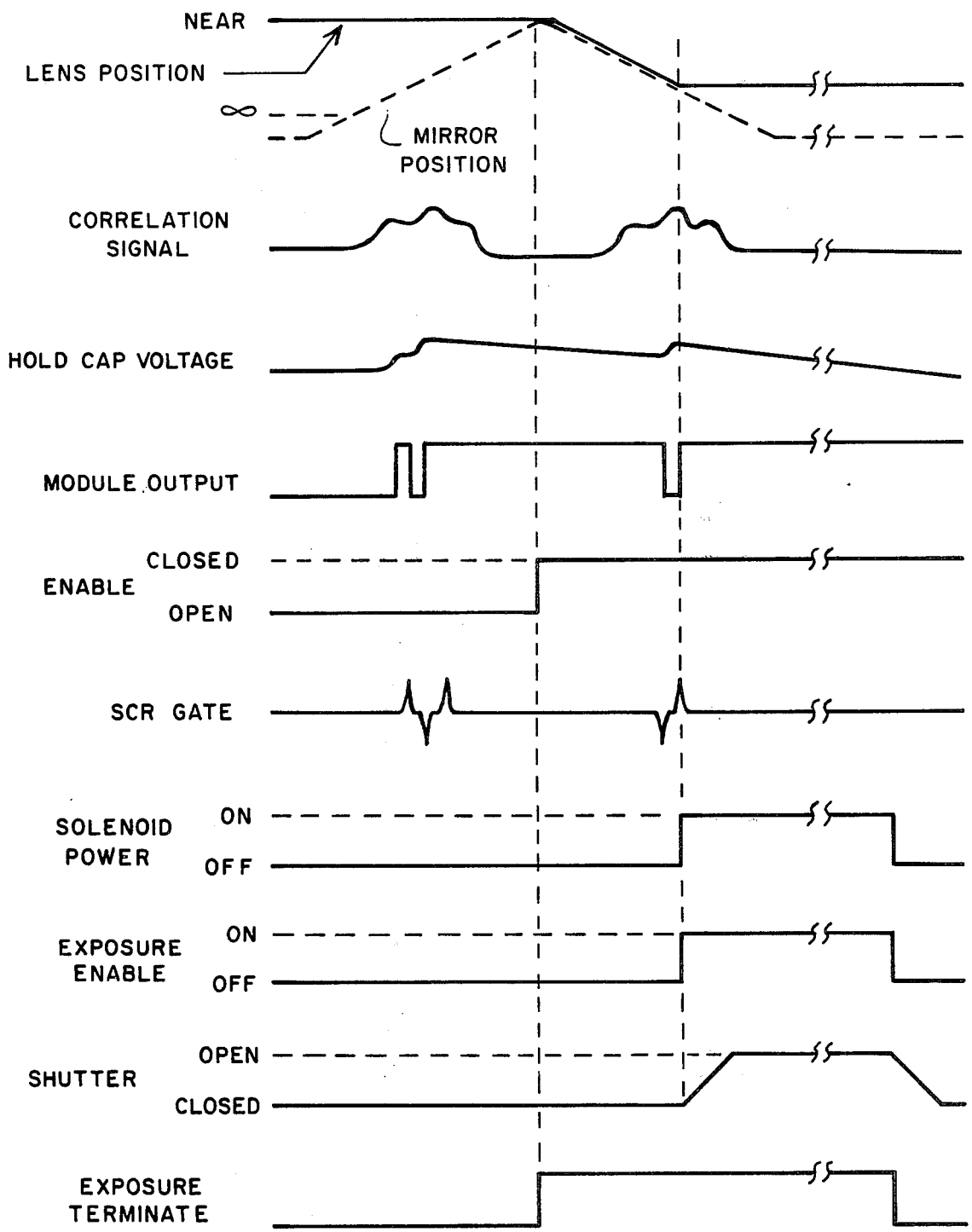
FIG. 14 shows waveforms associated with the operation of the system of FIG. 13.

The operation of the system of FIG. 13 is described in the waveforms shown in FIG. 14. In general, the operation is similar to that of the system of FIG. 11.

During the search scan, enable switch S2 is open. Transistor Q1 is turned off, and SCR1 and solenoid 52 are disabled.

Near the end of the search scan, enable switch S2 closes, thereby turning on transistor Q1. The potential at the base of Q1 and at the "terminate" terminal of the exposure control system 56 is increased.

When the output signal switches from "0" to "1" during the detection scan, this transition is differentiated and applied as a positive pulse to the gate of SCR1. SCR1 turns on and solenoid 52 is energized. Solenoid 52 stops the taking lens in the proper position and then releases the shutter to initiate the exposure. The exposure is terminated by exposure control system 56, which clamps the base of Q1, thereby turning Q1 off. This removes power from solenoid 52 and causes the shutter to close, thereby terminating the exposure.

In the event that the scanning mirror completes the detection scan without SCR1 being turned on, end-of-travel switch S3 closes, thereby energizing solenoid 52, which causes the shutter to open. Exposure is terminated in the same manner as previously described. End-of-travel switch S3, therefore, is necessary in order to provide proper operation of exposure control system 56 when the proper position of the taking lens is at its infinity position.

Figure 15:
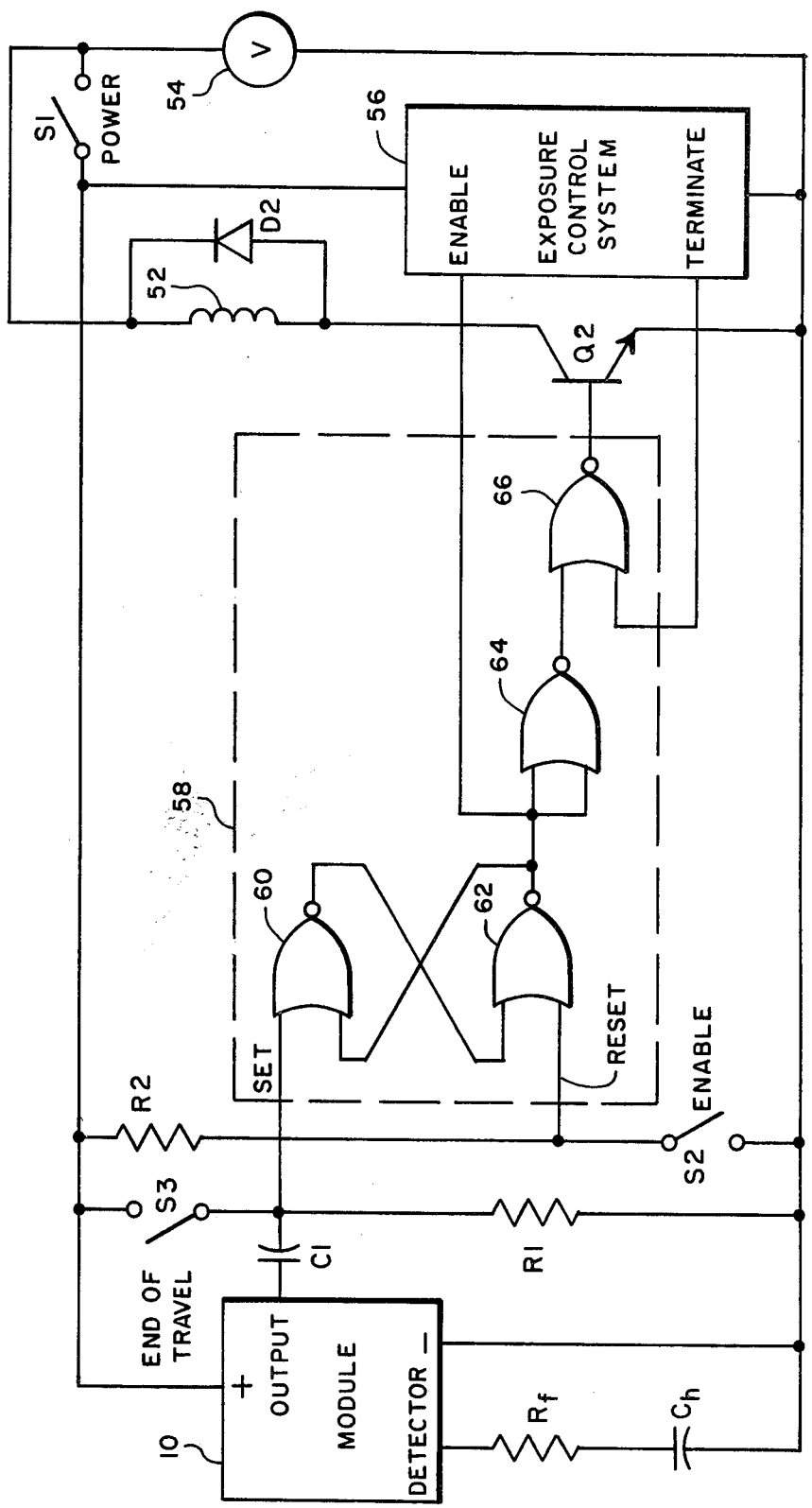
FIG. 15 is a schematic diagram of a dual scan single focus system using a RS latch.

FIG. 15 shows another dual scan single focus system in which SCR1 is replaced by a transistor Q2 and an integrated circuit 58. Two gates, 60 and 62, of integrated circuit 58 are used as an RS flip flop. The differentiated AF signal is fed to the "set" input of the RS flip flop, and the enable signal is fed to the "reset" input of the RS flip flop. A positive going pulse at the set input is only effective, therefore, when enable switch S2 is closed. The third and fourth gates, 64 and 66, provide a buffer for operation of the output transistor Q2 and also provide an input for exposure termination. Current limiting of the output transistor Q2 base is not required since the output of gate 66 is current limited at approximately a milliampere. The exposure control system operates to terminate the exposure by providing a "1" input to NOR gate 66. This causes a "0" output from gate 66 which clamps the base of output transistor Q2 to ground. Transistor Q2 turns off, thereby releasing solenoid 52. Since removal of signal power removes the base drive to the output transistor Q2, all switches in this embodiment operate on low current levels.

Figure 16:
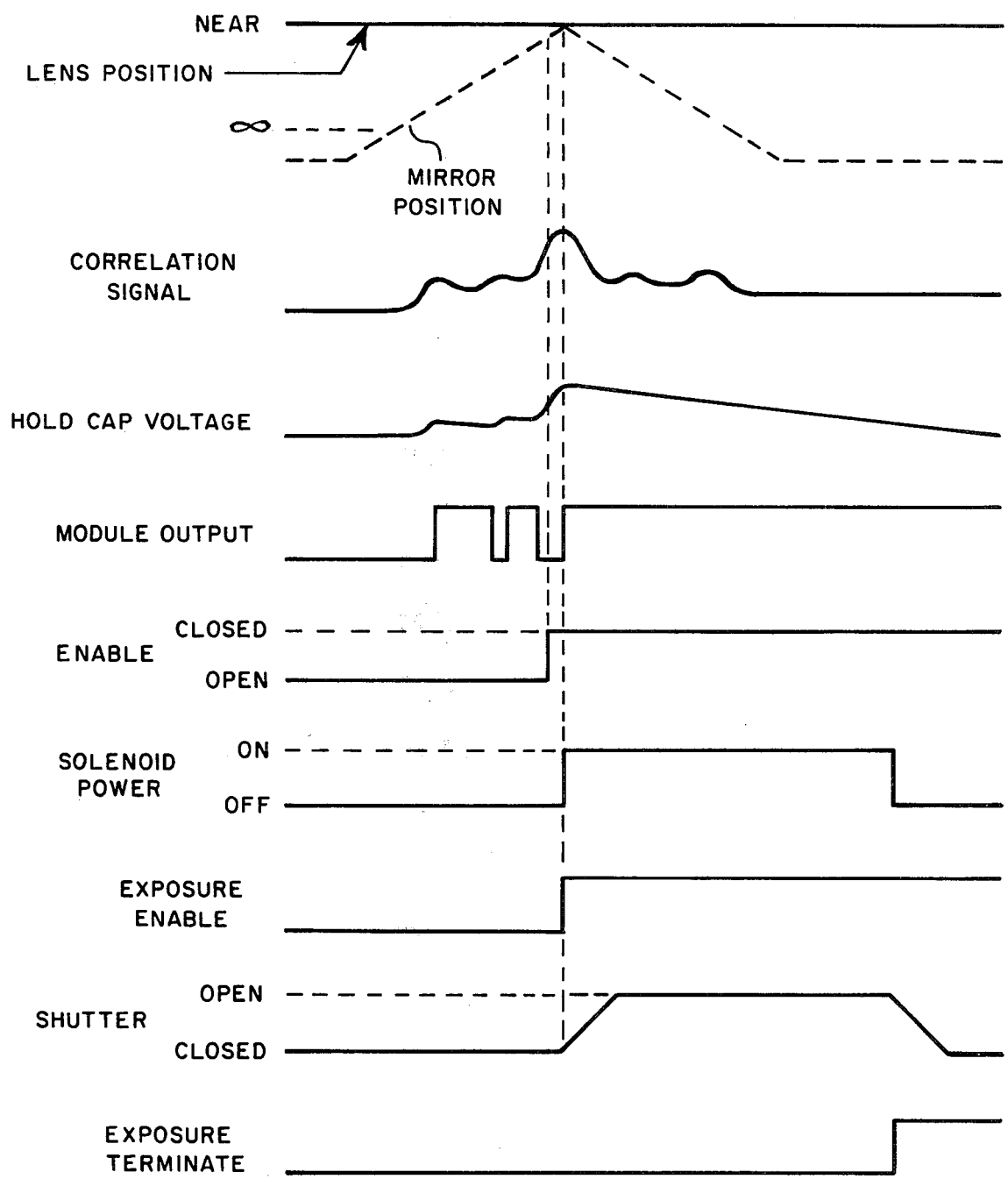
FIG. 16 shows waveforms associated with the operation of the system of FIG. 15.

FIG. 16 shows the waveforms associated with operation of the system of FIG. 15. In the particular example shown in FIG. 16, the maximum peak occurs at the end of the search scan and the beginning of the detection scan. The lens position, therefore, is not moved from the near position, but the shutter and the exposure control system are activated.

Figure 17:
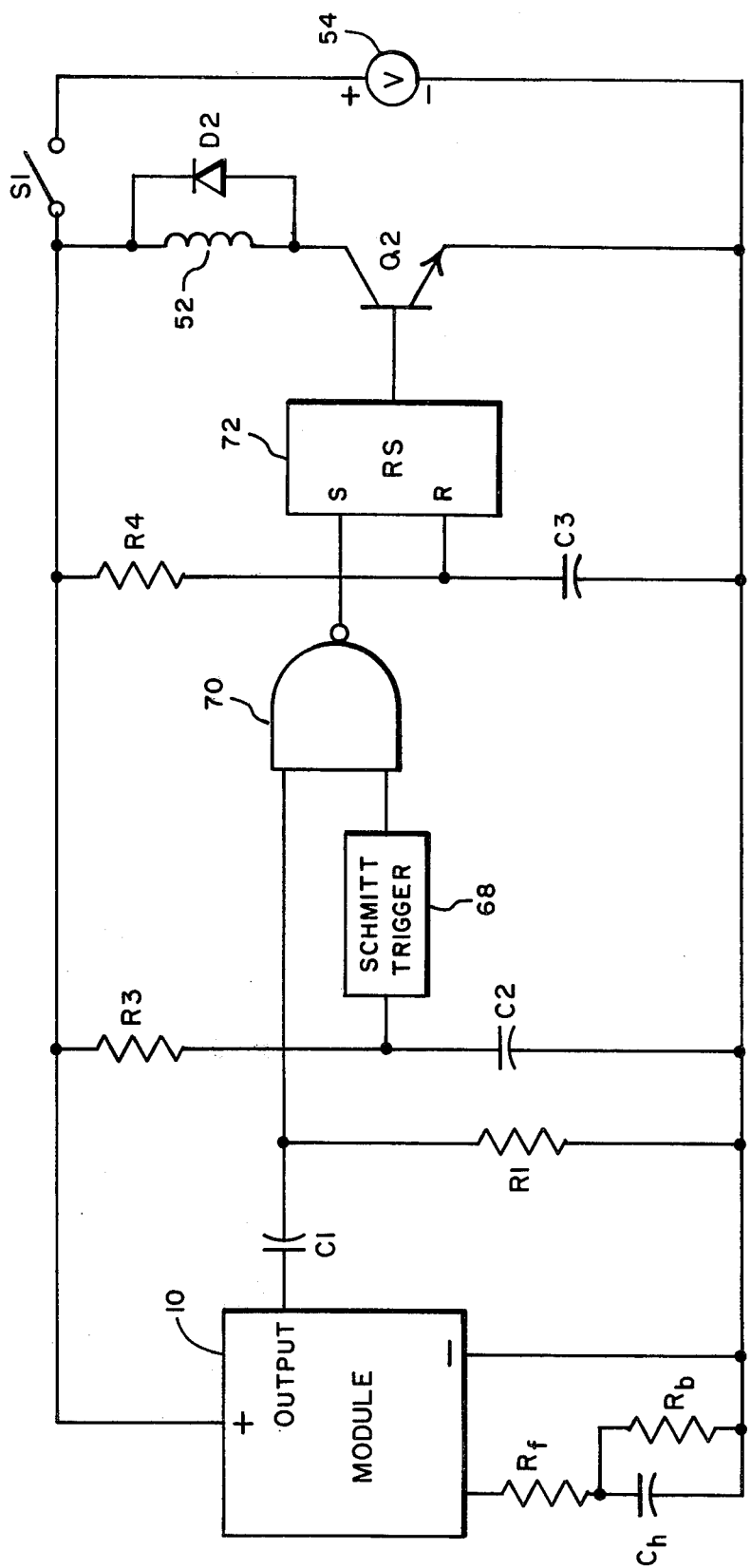
FIG. 17 is a schematic diagram of a dual scan single focus system in which an enable signal is produced electronically.

FIG. 17 shows still another embodiment of the present invention. In FIG. 17, an enable signal is provided by resistor R3, capacitor C2, and Schmitt trigger 68. The enable signal is applied to one input of NAND gate 70. The other input to NAND gate 70 is the differentiated output signal.

The output of NAND gate 70 is applied to the set input of RS flip flop 72. Resistor R4 and capacitor C3 form an integrator which applies a reset signal to the reset input of RS flip flop 72. The output of RS flip flop 72 is applied to the base of transistor Q2.

Figure 18:
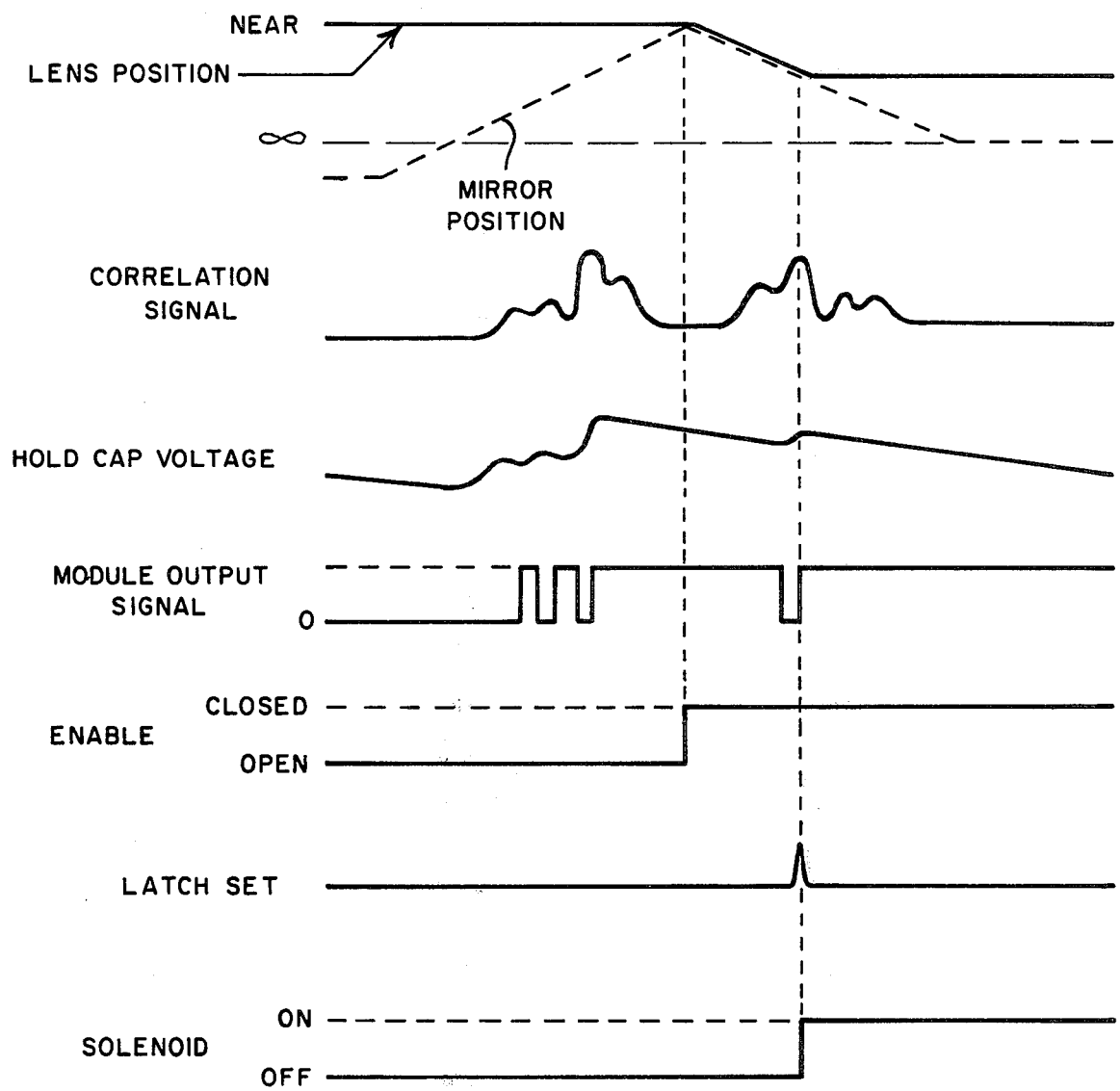
FIG. 18 shows waveforms associated with the operation of the system of FIG. 17.

FIG. 18 shows the various waveforms associated with the operation of the system of FIG. 17. As shown in FIG. 18, the scanning mirror is driven from far to near during the search scan and from near to far during the detection scan. The taking lens remains stationary at the near position throughout the search scan and follows the position of the mirror during the detection scan until proper focus position is found. At that time, the movement of the lens is halted by the energization of solenoid 52.

The operation of the system is commenced by closing of switch S1 by the user of the camera. The energy is then supplied through the circuit. The voltage at the input of Schmitt trigger 68 begins to rise at a rate determined by the value of resistor R3 and capacitor C2. These values are selected so that Schmitt trigger 46 will change state from "0" to "1" after the scanning mirror has completed the search scan and before it has started the detection scan. This results in a "0" input to NAND gate 70 from Schmitt trigger 68 during the search scan and a "1" input to NAND gate 70 during the detection scan.

The AF signal is differentiated by capacitor C1 and resistor R1. During the detection scan, therefore, there is a sharp positive pulse which corresponds to the detection of the maximum peak. This pulse, together with the "1" input from Schmitt trigger 68 during the detection scan causes the output of NAND gate 70 to temporarily change state, thereby switching RS flip flop 72 from the "reset" to the "set" state. This turns on transistor Q2 and energizes solenoid 52. Energization of solenoid 52 causes the taking lens motion to be stopped at a point corresponding to the desired focus position.

Dual Scan Single Focus Mirror and Lens Drive

The mirror and lens drive required for dual scan single focus of the present invention may be implemented in a variety of different manners. The particular mechanical system selected will depend on size, weight, cost, and other consideration. Simple mechanical systems which may be used in a dual scan single focus system are described in further detail in the above-mentioned co-pending patent application by Dean M. Peterson.

Conclusion

The dual scan automatic focus system of the present invention provides reliable focusing of a camera lens with minimum electrical and mechanical complexity. The dual scan of the present invention provides improved noise and false peak rejection. In addition, it allows simplified mechanical drive since during the detection scan since only one transition in the output signal (the "AF signal") will occur. The camera lens, therefore, can be driven during the detection scan along with the scan mirror until the AF signal occurs.

The dual scan automatic focus system may also be used to advantage in continuous focus systems as are required in motion picture cameras. Further discussion of dual scan continuous focus system is contained in my above-mentioned co-pending patent application entitled "Focus System for Movie Cameras", which was filed on even date with this application and is assigned to the same assignee.

While the present invention has been disclosed with reference to a series of preferred embodiments, workers skilled in the art will recognize that changes may be made in form and detail without departing from the spirit and scope of the invention.

The embodiments of the invention in which an exclusive property or right is claimed are defined as follows:

1. An optical system comprising:
    lens means for providing a primary image of an object;
    scanning means for providing first and second scans of an auxiliary image of the object;
    range sensing means for receiving the auxiliary image and providing a correlation signal having a major extremum in each scan indicative of the distance to the object;
    extremum sensing means for receiving the correlation signal and providing an output signal which changes from a first to a second state only once during the second scan;
    lens drive means for moving the lens means in a predetermined relationship with the scanning means during the second scan; and
    focus control means for halting motion of the lens means in response to the change of state of the output signal.

2. The optical system of claim 1 wherein the focus control means comprises:
    switching means for switching from a third to a fourth state when the output signal changes state;
    lens drive control means for halting motion of the lens means when the switching means switches to the fourth state; and
    enable means for preventing the switching means from switching during the first scan and enabling the switching means to switch during the second scan.

3. The optical system of claim 2 wherein the lens drive control means comprises solenoid means.

4. The optical system of claim 3 wherein the solenoid means causes the motion of the lens means to be halted when the solenoid means is energized.

5. The optical system of claim 4 and further comprising shutter means, and wherein the solenoid means also causes the shutter means to open when the solenoid means is energized.

6. The optical system of claim 5 wherein the shutter means closes in response to de-energization of the solenoid means.

7. The optical system of claim 6 and further comprising:
    exposure control means for controlling the time during which the shutter means is open.

8. The optical system of claim 7 wherein the exposure control means causes closing of the shutter means by de-energizing the solenoid means.

9. The optical system of claim 8 and further comprising:
    end-of-travel switching means for energizing the solenoid means at the end of the second scan in the event that the output signal did not change from the first to the second state during the second scan.

10. The optical system of claim 2 wherein the focus control means further comprises:
    differentiator means for differentiating the output signal and providing a pulse of a predetermined polarity to the switching means when the output signal changes from the first to the second state.

11. The optical system of claim 10 wherein the switching means comprises first semiconductor switching means having a control electrode and first and second main current carrying electrodes.

12. The optical system of claim 11 wherein the lens drive control means comprises solenoid means connected in series with the first and second main current carrying electrodes.

13. The optical system of claim 11 wherein the differentiator means applies the pulse to the control electrode of the first semiconductor switching means.

14. The optical system of claim 11 wherein the enable means comprises enable switch means connected in series with the first and second main current carrying electrodes.

15. The optical system of claim 11 wherein the enable means comprises:
    second semiconductor switching means connected in series with the first and second main current carrying electrodes of the first semiconductor switching means; and
    enable switch means for controlling the second semiconductor switching means.

16. The optical system of claim 11 wherein the first semiconductor switching means comprises an SCR.

17. The optical system of claim 10 wherein the switching means comprises an RS flip flop.

18. The optical system of claim 17 wherein the differentiator means applies the pulse to the set input of the RS flip flop.

19. The optical system of claim 18 wherein the enable means is connected to the reset input of the RS flip flop.

20. The optical system of claim 17 wherein the switching means further comprises transistor means connected to an output of the RS flip flop.

21. The optical system of claim 20 wherein the lens drive control means comprises solenoid means connected in series with the transistor means.

22. The optical system of claim 1 wherein the extremum sensing means comprises:
    hold capacitor means for storing a comparison signal having an amplitude dependent upon the amplitude of a previous extremum in the correlation signal; and
    comparing means for comparing the correlation signal and the comparison signal and providing an output determined by the comparison.

23. The optical system of claim 22 wherein the extremum sensing means further comprises:
    discharge timing means for discharging the hold capacitor means at a predetermined rate.

24. The optical system of claim 23 wherein the discharge timing means discharges the hold capacitor means by less than about 10% during the first and second scans.

25. The optical system of claim 24 wherein the comparing means changes from a fifth state to a sixth state when the amplitude of the comparison signal exceeds the correlation signal.

26. The optical system of claim 22 wherein the extremum sensing means further comprises:
    filter means for preventing the comparing means from changing from the fifth to the sixth state until the amplitude of the correlation signal decreases by a predetermined amount.

27. The optical system of claim 26 wherein the filter means comprises:
    filter resistor means connected in series with the hold capacitor means.

28. The optical system of claim 1 wherein the lens drive means maintains the lens means in its near field position limit during the first scan and moves the lens means towards its far field position limit during the second scan.

29. The optical system of claim 28 wherein the scanning means scans from its far field position limit to its near field position limit during the first scan and scans from its near field position limit toward its far field position limit during the second scan.

30. An optical system comprising:
lens means for providing a primary image of an object;
scanning means for providing first and second scans of an auxiliary image of the object;
range sensing means for receiving the auxiliary image and providing a correlation signal having a major extremum in each scan;
extremum sensing means for receiving the correlation signal and providing an output signal which changes from a first to a second state only once during the second scan, the change of state being indicative of the occurrence of the major extremum during the second scan;
lens drive means for moving the lens means; and
focus control means for controlling the lens drive means to move the lens means to a position determined by the position of the scanning means during the second scan when the output signal changes from the first to the second state.

31. The optical system of claim 30 wherein the extremum sensing means comprises:
hold capacitor means for storing a comparison signal having an amplitude dependent upon the amplitude of a previous extremum in the correlation signal; and
comparing means for comparing the correlation signal and the comparison signal and providing the output signal.

32. The optical system of claim 31 wherein the extremum sensing means further comprises:
discharge timing means for discharging the hold capacitor means at a predetermined rate.

33. The optical system of claim 32 wherein the discharge timing means discharges the hold capacitor means by less than about 10% during the first and second scans.

34. The optical system of claim 31 wherein the extremum sensing means further comprises:
filter means for preventing the comparing means for changing state until the amplitude of the correlation signal decreases by a predetermined amount.

35. The optical system of claim 34 wherein the filter means comprises:
filter resistor means connected in series with the hold capacitor means.

36. Apparatus for providing a measure of the distance between the apparatus and an object, the apparatus comprising:
first and second detector arrays for producing signals representative of the radiation received;
first auxiliary optical means for forming a first detection image of the object on the first detector array;
second auxiliary optical means for forming a second detection image of the object on the second detector array, the positions and radiation distributions of the first and second detection images on the corresponding arrays changing with changes in the relative positions of the first and second auxiliary optical means and the arrays, and with changes in the object distance, there being for each object distance a relative position at which there is best correspondence of the radiation distributions on the first and second detector arrays;
scanning means for relatively moving at least a portion of at least one of the first and second auxiliary optical means and the corresponding one of the arrays progressively through a predetermined range of relative positions during a first and a second scan, the range including one position at which there is best correspondence of the radiation distributions on the first and second detector arrays for the existing object distance;
signal processing means for comparing the signals from the first and second detector arrays and producing a correlation signal which exhibits a major extremum when the best correspondence of the radiation distributions on the first and second detector arrays is obtained during each of the first and second scans;
comparison signal means for providing a comparison signal, the comparison signal in the second scan being a function of the major extremum in the correlation signal during the first scan; and
comparing means for comparing the correlation signal with the comparison signal and producing an output signal which is a function of the comparison.

37. The apparatus of claim 36, wherein the first and second auxiliary optical means include first and second mirrors, respectively, and wherein the scanning means include means for moving the second mirror relative to the second detector array.

38. The apparatus of claim 36 wherein the output signal of the comparing means changes from a first to a second state only once during the second scan, the change of state being indicative of the major extremum during the second scan.

39. In an optical system including primary optical means, an automatic focusing system for positioning the primary optical means, the automatic focusing system comprising:
spatial image correlation range sensing means for providing a correlation signal having a major extremum indicative of the distance to an object, the spatial image correlation range sensing means including scanning means for providing first and second scans of an image of the object;
comparison signal means for providing a comparison signal during the second scan which is a function of the amplitude of the major extremum in the correlation signal during the first scan;
comparing means for comparing the correlation signal with the comparison signal and producing an output signal which changes from a first to a second state only once during the second scan, and the change being indicative of the major extremum during the second scan;
position means for positioning the primary optical means to a position determined by the position of the scanning means when the output signal changes from the first to the second state during the second scan.

40. The invention of claim 39 wherein the positioning means comprises:
primary optical drive means for moving the primary optical means in a predetermined relationship with the scanning means during the second scan; and focus control means for halting motion of the primary optical means in response to the change in the output signal from the first to the second state.

41. The invention of claim 39 wherein the comparison signal means comprises:
hold capacitor means for storing the comparison signal; and
discharge timing means for discharging the capacitor means at a predetermined rate.

42. An optical system comprising:
primary optical means for providing a primary image of an object;
auxiliary optical means for providing first and second auxiliary images of the object;
scanning means for providing first and second scans of the second auxiliary image;
range sensing means for producing a correlation signal having a major extremum during each scan indicative of best correspondence of the first and second auxiliary images;
comparison signal means for providing a comparison signal during the second scan which is a function of the amplitude of the major extremum in the correlation signal during the first scan;
comparing means for comparing the correlation signal and the comparison signal and producing an output signal which changes from a first to a second state during the second scan only when the correlation signal has a major extremum;
positioning means for positioning the primary optical means to a position determined by the position of the scanning means during the second scan when the output signal changes from the first to the second state.

* * * * *